Figure 1:
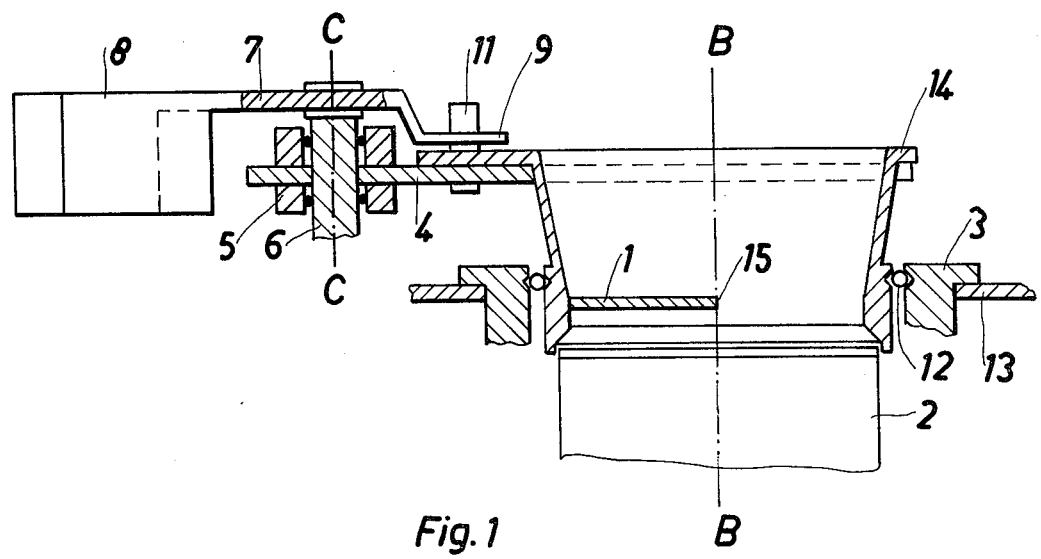

United States Patent [19]

Böhme

[11] 4,078,861
[45] Mar. 14, 1978

[54] APERTURE CONTROL MECHANISM, PARTICULARLY FOR PLANETARIUM PROJECTORS

[76] Inventor: Helmut Böhme, 3, Georg-Buchner-Strasse, Jena, District of Gera, Germany

[21] Appl. No.: 762,355

[22] Filed: Feb. 7, 1977

[51] Int. Cl.² ............................................. G03B 21/14
[52] U.S. Cl. ........................................ 353/97; 353/88; 33/391; 356/250
[58] Field of Search ...................... 353/97, 88, 75, 79, 353/80, 11, 62; 35/42.5; 33/234, 275, 391, 398; 356/250, 149

[56] References Cited

U.S. PATENT DOCUMENTS

| 1,295,075 | 2/1919 | Sheppard | 33/234 |
| 2,407,416 | 9/1946 | Gudmundson | 356/250 |
| 3,908,282 | 9/1975 | Steffan | 33/234 |

*Primary Examiner*—Richard E. Aegerter
*Assistant Examiner*—John W. Shepperd

[57] ABSTRACT

An aperture control mechanism particularly for use in planetarium projectors, including a weight lever for controlling the horizontal position of the edge of an aperture, said weight lever is seated for rotation on a plate, the rotations being limited to two stops mounted on said plate, at which stops a projection of the weight lever is arrested.

2 Claims, 2 Drawing Figures

APERTURE CONTROL MECHANISM, PARTICULARLY FOR PLANETARIUM PROJECTORS

This invention relates to a mechanism for aperture control, particularly for use in projectors of planetaria, including a weight lever which, rotatably seated about the optical axis of the projector, keeps the aperture edge to a horizontal position.

Previous mechanisms for controlling rotatable planetarium projector apertures provide weight levers in rigid connection with an aperture ring.

When the projector is rotated the weight lever, due to the force of gravity, keeps the aperture edge which limits the light beam, to a horizontal position.

However, the frictional resistance inherent in the aperture seating involves the following disadvantages.

In certain positions of the projector axis, such as the zenith-nadir direction, a considerable deviation from said direction is necessary to move the aperture ring and thus the aperture into the required position.

When the position is obtained, the lever oscillates about the position of equilibrium, due to the energy stored in the lever, before the latter position is occupied. This oscillation causes an interfering noise which, in turn, is a disturbance to any planetarium presentation.

It is an object of the present invention to obviate the above disadvantages.

It is a further object of the present invention to provide an aperture control mechanism which eliminates oscillations of a weight lever when a projector is moved from out of a vertical position and hence the weight lever takes a new position of equilibrium even at minor deviations.

These and other objects are realised by an aperture control mechanism in which a weight lever is seated for rotation in a bearing on a plate mount which is rigidly connection to an aperture ring. A projection is provided on the end portion of the weight lever which is located opposite to the aperture ring adjacent to the seating. Two stops are provided on the plate mount which serve to arrest the deviations of the weight lever.

Advantageously, the weight lever seating has a smaller diameter than the aperture ring seating so that the weight lever has to overcome a lower frictional resistance.

In order that the invention may be more readily understood reference is made to the accompanying drawings which illustrate diagrammatically and by way of example one embodiment thereof and in which:

FIG. 1 is a cross-sectional view of an aperture control device and

Figure 2:
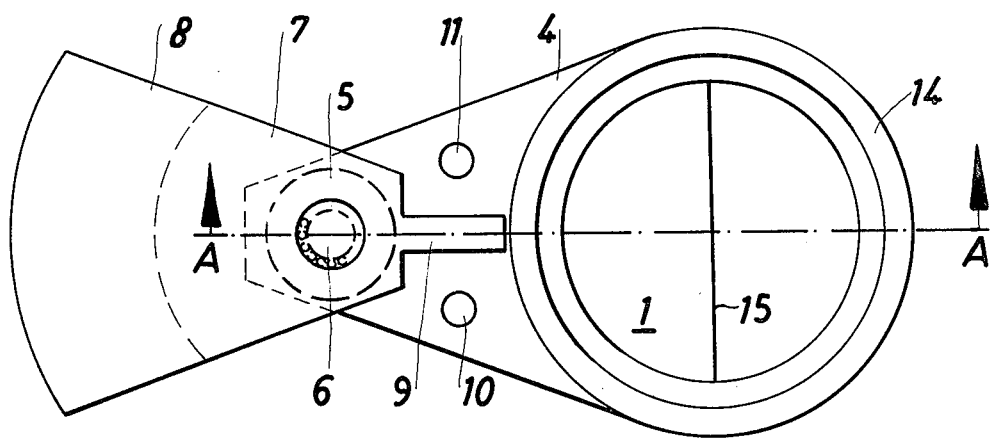

FIG. 2 a top view of the same. de

In FIG. 1 a section along the line A—A (FIG. 2) of an aperture control device shows a projector 2, (only partially visible) upon which an aperture ring 14, is seated for rotation about an axis B—B in a seating 3, which includes balls 12.

An aperture 1 having an edge 15 is arranged in the aperture ring 14.

The seating 3 abuts against parts of a projector housing 13.

The aperture ring 14 is rigidly connected to and mounted in a plate 4.

In an opening of plate 4 a pivot pin 6 is seated for rotations in bearings 5 about an axis C—C.

A weight lever 7 having on one end portion a counter weight 8 is secured to the pivot pin 6.

On the other end portion, opposite to the aperture ring 14 the lever 7 tapers to a projection 9.

Stops 10 and 11, in FIG. 1 only the stop 11 is shown, are mounted on the plate 4.

In FIG. 2 the stops 10 and 11 are symmetrically arranged to the line A—A on the plate 4, and between said stops the projection 9 is located.

When the projector 9 is in a substantially vertical position, the weight lever 7 and the weight 8 will follow the force of gravity even at minor deviations from the former position into a new position of equilibrium.

When the projector 3 is further displaced the projection 9 of the weight lever 7 contacts one of the stops 10, 11 and in this manner the movement is transferred to the plate 4; after the frictional resistance of the seating 3 is overcome, the aperture ring 14, which was at rest, follows the movement of the weight lever 7 into a new position of equilibrium.

The edge 15 of the aperture 1 is thus kept to a horizontal position, due to the continuously adjusted position of equilibrium, which corresponds to the position of gravity.

Since the frictional resistance of the seating 5 of the weight lever 7 can easily be kept to lower values, due to a smaller diameter, compared to the seating 3, the weight lever 7 is deviated up to the stops 10 and 11, respectively, even when the projector is subject to minor deviations.

When the direction of the movement is rapidly changed, the weight lever 7 abruptly changes its position and takes a new position of equilibrium.

In a not shown alternative embodiment the aperture is a spherical segment which is rotatable about a further axis in addition and at right angles to the axis B—B.

I claim:

1. An aperture control mechanism comprising
   a projector,
   an aperture,
   an aperture ring
   said aperture, ring forming said aperture
   a first seating means for rotatably mounting said aperture ring to said projector,
   a plate being non-displaceably connected to sai aperture ring,
   a second seating means being arranged in said plate substantially in parallel to said first seating,
   a pivot pin,
   a weight lever being provided with a weight and a projection on opposite end portions,
   said pinion being secured to said weight lever and seated for rotations in said second seating means,
   a first and a second stop being mounted on said plate,
   said projection on said weight lever projecting between said first stop and said second stop on said plate to arrest the rotation of said weight lever.

2. An aperture control mechanism as claimed in claim 1, wherein said second seating having a diameter smaller than the diameter of said first seating.

* * * * *